US010850471B2

(12) United States Patent
Dawson et al.

(10) Patent No.: US 10,850,471 B2
(45) Date of Patent: Dec. 1, 2020

(54) ABSORBENT FLOOR MAT

(71) Applicant: Milliken & Company, Spartanburg, SC (US)

(72) Inventors: Ty G. Dawson, Spartanburg, SC (US); Franklin S. Love, III, Columbus, NC (US); Venkatkrishna Raghavendran, Houston, TX (US); Brandon T. Roberts, Greer, SC (US); Padmakumar Puthillath, Greer, SC (US); Dale S. Kitchen, Boiling Springs, SC (US); Gordon J. Stannis, Saugatuck, MI (US); Brent A. Beukema, Grand Rapids, MI (US)

(73) Assignee: Milliken & Company, Spartanburg, SC (US)

( * ) Notice: Subject to any disclaimer, the term of this patent is extended or adjusted under 35 U.S.C. 154(b) by 520 days.

(21) Appl. No.: 15/343,282

(22) Filed: Nov. 4, 2016

(65) Prior Publication Data

US 2017/0136724 A1 May 18, 2017

Related U.S. Application Data

(60) Provisional application No. 62/256,731, filed on Nov. 18, 2015.

(51) Int. Cl.
*B32B 3/06* (2006.01)
*B32B 3/30* (2006.01)
(Continued)

(52) U.S. Cl.
CPC .............. *B32B 3/06* (2013.01); *A47L 23/266* (2013.01); *B32B 3/30* (2013.01); *B32B 5/02* (2013.01);
(Continued)

(58) Field of Classification Search
CPC ............ D06N 7/0071; D06N 2209/04; D06N 2209/045; D06N 2213/068;
(Continued)

(56) References Cited

U.S. PATENT DOCUMENTS

| 3,578,738 A | | 5/1971 | Hughes | 15/215 |
| 4,405,674 A | * | 9/1983 | Kyle | D06N 7/0042 427/128 |

(Continued)

FOREIGN PATENT DOCUMENTS

| EP | 379630 A | * | 8/1990 |
| EP | 0 653 179 | | 5/1995 |

(Continued)

OTHER PUBLICATIONS

Patent Cooperation Treaty PCT International Search Report, dated Feb. 10, 2017. International Application No. PCT/US2016/061111. International Filing Date, Nov. 9, 2016.

*Primary Examiner* — Cheryl Juska
(74) *Attorney, Agent, or Firm* — Brenda D. Wentz

(57) ABSTRACT

This invention relates to a multi-component absorbent floor mat. The floor mat contains a textile component, an absorbent component, and a base component. The textile component and the base component are attached to one another by a variety of mechanisms, including magnetic attraction. The magnetic attraction is provided by incorporation of magnetic particles in both the textile and base components. The textile component is designed to be soiled, washed, and re-used, thereby providing ideal end-use applications in areas such as building entryways. The absorbent component is designed to be soiled and recycled or otherwise discarded and replaced.

14 Claims, 2 Drawing Sheets

(51) Int. Cl.
*D05C 17/02* (2006.01)
*B32B 5/02* (2006.01)
*A47L 23/26* (2006.01)
*D06N 7/00* (2006.01)

(52) U.S. Cl.
CPC .......... *D05C 17/02* (2013.01); *D06N 7/0071* (2013.01); *B32B 2274/00* (2013.01); *B32B 2307/51* (2013.01); *B32B 2307/726* (2013.01); *B32B 2471/02* (2013.01); *B32B 2471/04* (2013.01); *D06N 2209/04* (2013.01); *D06N 2209/045* (2013.01); *D06N 2213/068* (2013.01); *D10B 2503/042* (2013.01); *Y10T 428/23979* (2015.04)

(58) Field of Classification Search
CPC ..... Y10T 428/23979; B32B 3/06; B32B 3/30; B32B 5/02; B32B 2274/00; B32B 2307/726; B32B 2471/02; B32B 2471/04; D05C 17/02; A47L 23/266
See application file for complete search history.

(56) References Cited

U.S. PATENT DOCUMENTS

| | | | | |
|---|---|---|---|---|
| 4,609,580 A | * | 9/1986 | Rockett | A47G 27/0206 428/198 |
| 4,876,135 A | * | 10/1989 | McIntosh | A47L 23/266 428/74 |
| 5,114,774 A | * | 5/1992 | Maxim, Jr. | A47G 27/0206 428/100 |
| 5,305,565 A | * | 4/1994 | Nagahama | A47L 23/266 52/177 |
| 5,524,317 A | * | 6/1996 | Nagahama | A47L 23/266 15/215 |
| 5,752,357 A | * | 5/1998 | Piller | A47G 27/0437 156/310 |
| 5,811,165 A | * | 9/1998 | Andreen | A47L 23/266 15/217 |
| 5,914,169 A | * | 6/1999 | Brunetto | B32B 5/26 15/215 |
| 5,962,350 A | * | 10/1999 | Krotine | A47L 23/266 428/95 |
| 6,295,658 B1 | * | 10/2001 | Jenkins | A47G 27/0225 4/251.1 |
| 6,428,873 B1 | * | 8/2002 | Kerr | A46B 5/06 428/95 |
| 6,446,275 B1 | * | 9/2002 | Wright | A47G 27/0206 4/251.1 |
| 7,597,949 B2 | * | 10/2009 | Wright | A47G 27/0206 428/116 |
| 7,678,159 B1 | | 3/2010 | Weiner | 8/478 |
| 7,846,214 B1 | | 12/2010 | Weiner | 8/478 |
| 9,937,842 B2 | * | 4/2018 | Chavez Martinez | B60N 3/048 |
| 2001/0011399 A1 | * | 8/2001 | Blum | A47L 23/22 15/215 |
| 2002/0045021 A1 | * | 4/2002 | Brown | A47L 23/266 428/47 |
| 2003/0093870 A1 | * | 5/2003 | Blum | A47L 23/22 15/215 |
| 2003/0135947 A1 | | 7/2003 | McKay | 15/215 |
| 2003/0180499 A1 | | 9/2003 | Kobayashi et al. | 428/95 |
| 2004/0013849 A1 | | 1/2004 | Kobayashi | 428/95 |
| 2004/0048036 A1 | | 3/2004 | Nakasuji | B32B 5/26 428/95 |
| 2004/0067337 A1 | * | 4/2004 | Lafleur | B32B 7/02 428/138 |
| 2012/0019022 A1 | * | 1/2012 | Cianci | B60N 3/042 296/97.23 |
| 2015/0251375 A1 | * | 9/2015 | Lin | B32B 25/045 428/213 |
| 2016/0037949 A1 | | 2/2016 | Dawson et al. | |
| 2017/0037567 A1 | | 2/2017 | Love et al. | |
| 2017/0037568 A1 | | 2/2017 | Love et al. | |
| 2018/0015862 A1 | * | 1/2018 | Chavez Martinez | B60N 3/048 |

FOREIGN PATENT DOCUMENTS

FR 2792820 11/2000
RU 2199452 C2 * 2/2003

* cited by examiner

ABSORBENT FLOOR MAT

CROSS REFERENCE TO RELATED APPLICATIONS

This application claims priority to U.S. Provisional Patent Application No. 62/256,731, entitled "Absorbent Floor Mat" which was filed on Nov. 18, 2015, and which is entirely incorporated by reference herein.

TECHNICAL FIELD

This invention relates to a multi-component absorbent floor mat. The floor mat contains a textile component, an absorbent component, and a base component. The textile component and the base component are attached to one another by a variety of mechanisms, including magnetic attraction. The magnetic attraction is provided by incorporation of magnetic particles in both the textile and base components. The textile component is designed to be soiled, washed, and re-used, thereby providing ideal end-use applications in areas such as building entryways. The absorbent component is designed to be soiled and recycled or otherwise discarded and replaced.

BACKGROUND

High traffic areas, such as entrances to buildings, restrooms, break areas, etc., typically have the highest floorcovering soiling issue. Currently, washable one-piece mats having a pile surface are found in these locations. The washable multi-component floor mat of the present invention is designed to replace these one-piece floor mats. The use of washable multi-component floor mats in high traffic, highly soiled areas is pragmatic because the soiled textile component may be easily removed, laundered, and re-installed. The need to launder the base portion of the floor mat is eliminated. The reduction in weight and bulk from one-piece mats to the textile component of the multi-component mat provides significant savings in water and energy for the laundering facilities and in labor for the service people that transport and install the floor mats.

Furthermore, the incorporation of an absorbent component between the textile and base components allow for the absorption of liquid that may otherwise present a slip hazard in the area on and around the floor mat. The absorbent component can be easily removed and replaced when soiled, due to the floor mat having a removable textile component overlaying the absorbent component.

In addition, because the attachment mechanisms can utilize a high amount of force to hold the top and bottom components of the floor mat together, the initial alignment and deployment of the top textile component onto the base component can present challenges. This problem is exaggerated by the large surface area of the two components that are in contact with one another. In this regard, even if the adherence force per unit area is low, the large surface area means that the total resistance to sliding and movement can be very high making realignment of the components very difficult. If not corrected, mis-alignment of the textile component with the base component may create trip hazards within the floor mat and may be aesthetically not pleasing.

The present invention overcomes the challenges of one-piece floor mats and slip and trip hazards. Thus, the washable multi-component absorbent floor mats of the present invention are an improvement over one-piece floor mats of the prior art.

BRIEF SUMMARY

In one aspect, the invention relates to a multi-component, absorbent floor mat comprising: (a) a textile component comprising (i) a first layer of tufted pile carpet formed by tufting face yarns through a primary backing layer and (ii) a second layer comprised of at least one polymer selected from the group consisting of thermoplastic and thermoset elastomers, (b) at least one absorbent component, and (c) a base component comprised of materials selected from the group consisting of at least one polymer selected from the group consisting of thermoplastic elastomers and thermoset elastomers, a metal material, a cellulose-containing material, and combinations thereof, and wherein the textile component and the base component are releasably attachable to one another via at least one attachment means.

In another aspect, the invention relates to a flooring system comprised of at least two multi-component, absorbent mats, wherein the multi-component, absorbent mat is comprised of: (a) a textile component comprising (i) a first layer of tufted pile carpet formed by tufting face yarns through a primary backing layer and (ii) a second layer comprised of at least one polymer selected from the group consisting of thermoplastic and thermoset elastomers, (b) at least one absorbent component, and (c) a base component comprised of materials selected from the group consisting of at least one polymer selected from the group consisting of thermoplastic elastomers and thermoset elastomers, a metal material, a cellulose-containing material, and combinations thereof, and wherein the textile component and the base component are releasably attachable to one another via at least one attachment means.

DETAILED DESCRIPTION

The present invention described herein is a washable, multi-component absorbent floor mat. The mats are comprised of a textile component, an absorbent component and a base component. The textile component and the base component may be attached to one another via a variety of attachment means, including magnet attraction.

Figure 1:
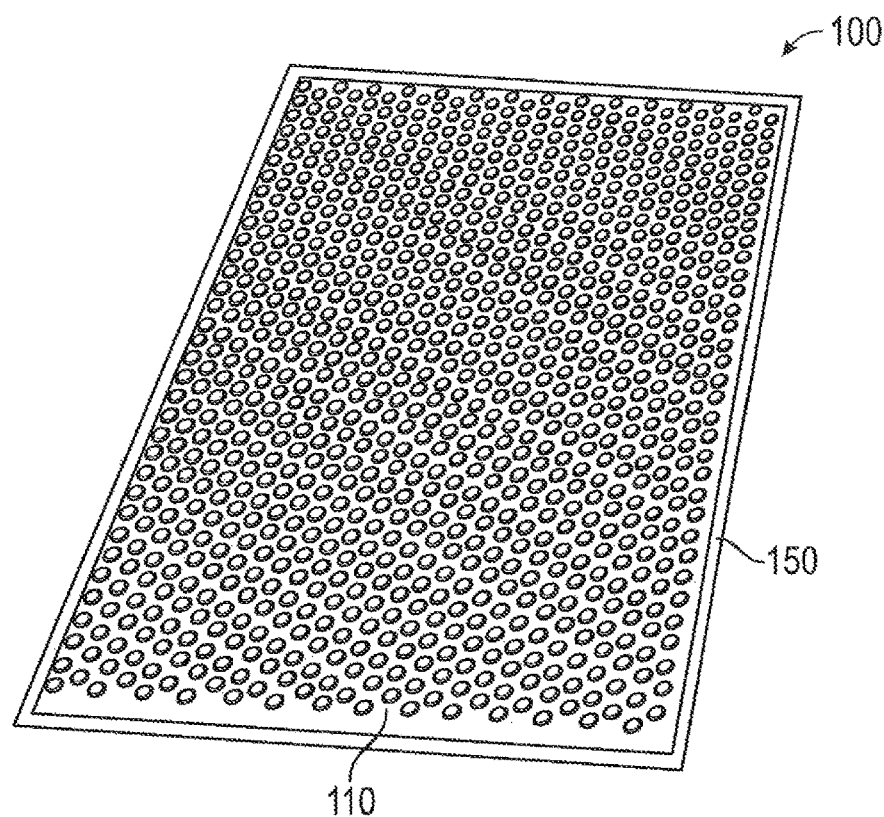
FIG. 1 is a schematic diagram of one embodiment of the absorbent mat of the present invention.
Figure 2:
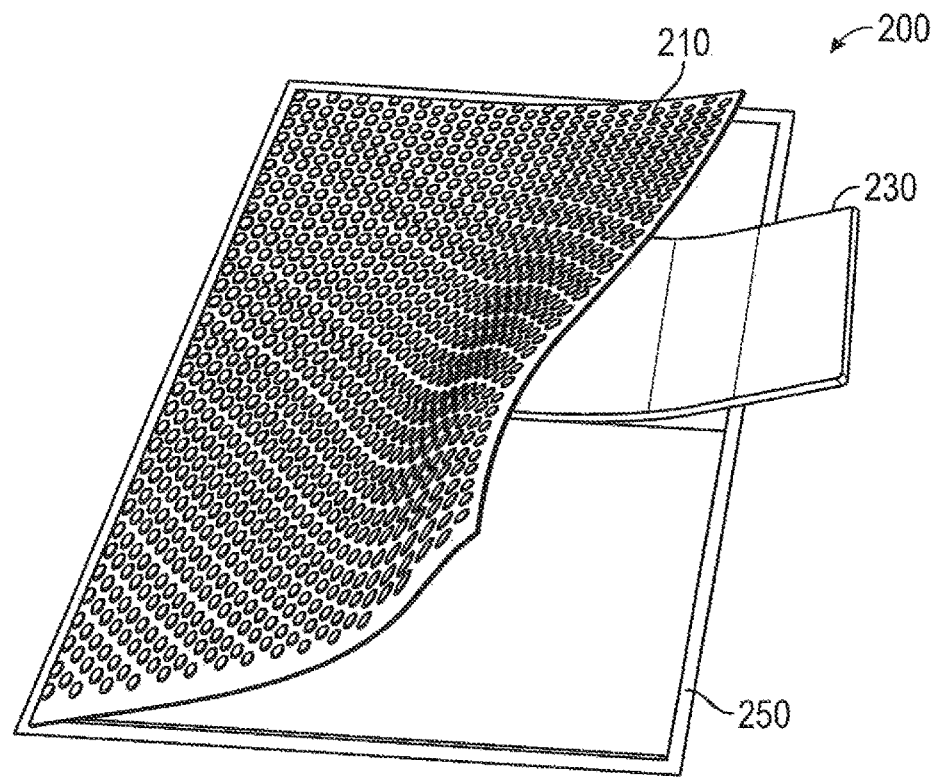
FIG. 2 is a schematic diagram of one embodiment of the absorbent mat of the present invention with a portion of the textile component pulled back.

As illustrated in FIG. 1, the present invention describes a washable, multi-component absorbent floor mat 100 comprised, in part, of textile component 110 and base component 150. FIG. 2 shows absorbent floor mat 200 comprised of textile component 210, absorbent component 230, and base component 250. In this particular embodiment, absorbent component 230 is shown having multiple pieces or sections. However, it is contemplated to be within the scope of the present invention that the absorbent component may be comprised of a unitary, single article.

Figure 3A:
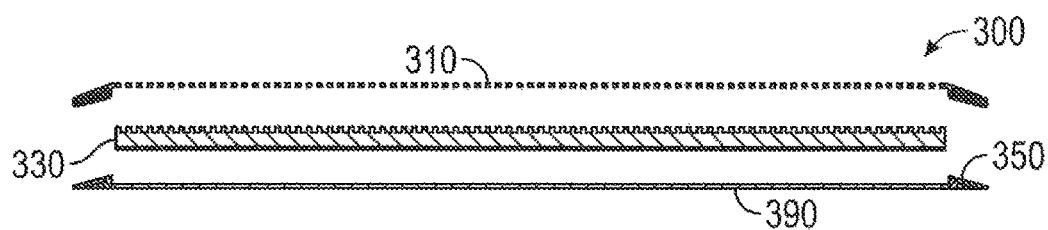
FIG. 3A is an expanded side view of the components comprising the absorbent mat in an unassembled arrangement.

FIG. 3A illustrates the unassembled arrangement of the components comprising absorbent floor mat 300. The base component 350 lies primarily in a planar configuration with floor surface 390 (or other absorbent mat-receiving area). The next layer is absorbent component 330. Finally, textile component 310 is the uppermost layer of absorbent mat 300.

Figure 3B:
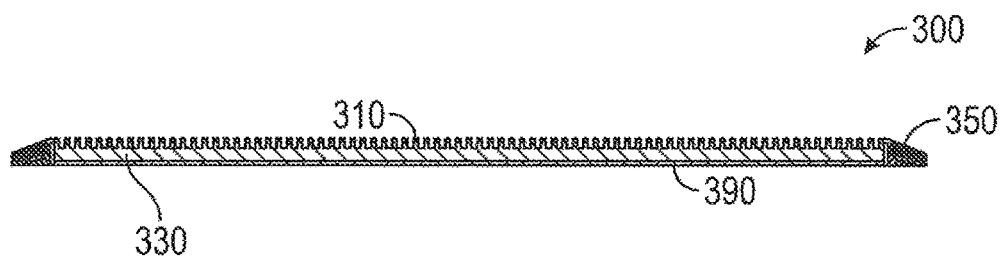
FIG. 3B is an expanded side view of the components comprising the absorbent mat in an assembled arrangement.

FIG. 3B illustrates the assembled arrangement of the components of absorbent mat 300. Base component 350 receives absorbent component 330 within its perimeter. Absorbent component 330 is aligned substantially parallel with and immediately adjacent to floor surface 390. Textile component 310 is aligned substantially parallel with and immediately adjacent to absorbent component 330. Textile component 310 covers and at least partially encapsulates absorbent component 330 and base component 350.

Figure 3C:
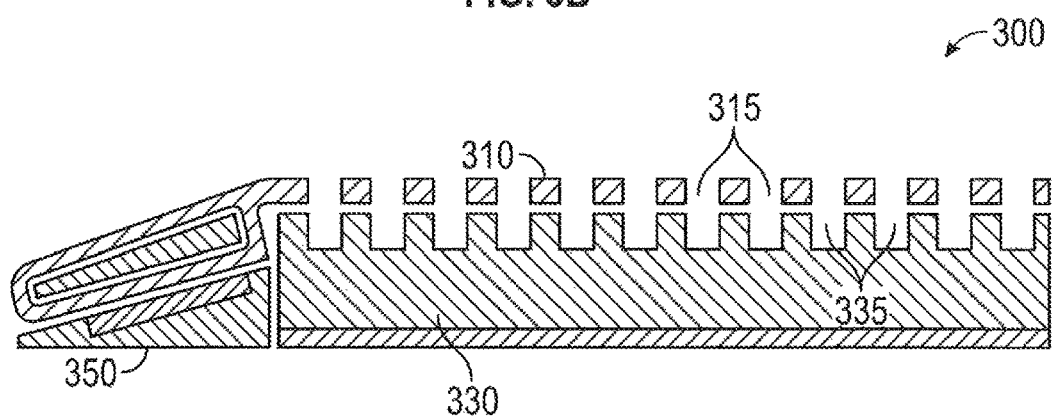
FIG. 3C is an expanded, partial side view of the absorbent mat of FIG. 3B.

FIG. 3C shows a portion of absorbent mat 300 wherein textile component 310 is attached to base component 350. Attachment of the textile component with the base component occurs via a variety of attachment means described later herein. Absorbent component 330 is at least partially encased by base component 350 and textile component 310. In this embodiment, textile component 310 contains a somewhat perforated appearance due to areas of the textile component having openings 315. Openings 315 are present for allowing dirt, debris, and liquid to easily pass through textile component 310 and to contact absorbent component 330. In one aspect, absorbent component 330 contains corresponding openings 335 which line up with openings 315 of textile component 315. This arrangement is further illustrated in FIG. 4.

Figure 4:
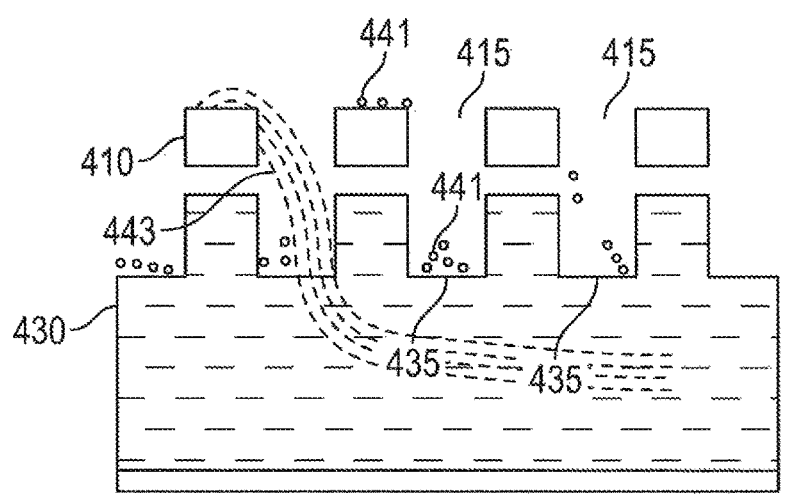
FIG. 4 is a schematic diagram of a portion of the absorbent mat illustrating the drain and sift feature of the mat.

FIG. 4 illustrates a portion of absorbent mat 400 having absorbent component 430 and textile component 410. Absorbent component 430 contains openings 435 which line up with openings 415 of textile component 410. This arrangement allows dirt 441 and liquid 443 to easily pass from the surface of textile component 410 to absorbent component 430.

Any of the embodiments shown and illustrated by the Figures of the present application or described herein may be combined with one another to form additional embodiments contemplated to in the scope of the present invention.

The base component of the floor mat may be partially or wholly covered with a textile component. Typically, the textile component will be lighter in weight than the base component. Inversely, the base component will weigh more than the textile component.

The textile component may be comprised of tufted pile carpet. Tufted pile carpet is comprised of a primary backing layer and face yarns. The primary backing layer is typically included in the tufted pile carpet to give stability to the face yarns. The materials comprising the face yarns and the primary backing layer may independently be selected from synthetic fiber, natural fiber, man-made fiber using natural constituents, inorganic fiber, glass fiber, and a blend of any of the foregoing. By way of example only, synthetic fibers may include polyester, acrylic, polyamide, polyolefin, polyaramid, polyurethane, or blends thereof. More specifically, polyester may include polyethylene terephthalate, polytrimethylene terephthalate, polybutylene terephthalate, polylactic acid, or combinations thereof. Polyamide may include nylon 6, nylon 6,6, or combinations thereof. Polyolefin may include polypropylene, polyethylene, or combinations thereof. Polyaramid may include poly-p-phenyleneteraphthalamide (i.e., Kevlar®), poly-m-phenyleneteraphthalamide (i.e., Nomex®), or combinations thereof. Exemplary natural fibers include wool, cotton, linen, ramie, jute, flax, silk, hemp, or blends thereof. Exemplary man-made materials using natural constituents include regenerated cellulose (i.e., rayon), lyocell, or blends thereof.

The material comprising the face yarns and primary backing layer may be formed from staple fiber, filament fiber, slit film fiber, or combinations thereof. The fiber may be exposed to one or more texturing processes. The fiber may then be spun or otherwise combined into yarns, for example, by ring spinning, open-end spinning, air jet spinning, vortex spinning, or combinations thereof. Accordingly, the material comprising the face yarns will generally be comprised of interlaced fibers, interlaced yarns, loops, or combinations thereof.

The material comprising the face yarns and primary backing layer may be comprised of fibers or yarns of any size, including microdenier fibers or yarns (fibers or yarns having less than one denier per filament). The fibers or yarns may have deniers that range from less than about 0.1 denier per filament to about 2000 denier per filament or, more preferably, from less than about 1 denier per filament to about 500 denier per filament.

Furthermore, the material comprising the face yarns and primary backing layer may be partially or wholly comprised of multi-component or bi-component fibers or yarns in various configurations such as, for example, islands-in-the-sea, core and sheath, side-by-side, or pie configurations. Depending on the configuration of the bi-component or multi-component fibers or yarns, the fibers or yarns may be splittable along their length by chemical or mechanical action.

Additionally, the face yarns and the primary backing layer may include additives coextruded therein, may be precoated with any number of different materials, including those listed in greater detail below, and/or may be dyed or colored to provide other aesthetic features for the end user with any type of colorant, such as, for example, poly(oxyalkylenated) colorants, as well as pigments, dyes, tints, and the like. Other additives may also be present on and/or within the target fiber or yarn, including antistatic agents, brightening compounds, nucleating agents, antioxidants, UV stabilizers, fillers, permanent press finishes, softeners, lubricants, curing accelerators, and the like.

The face yarns may be dyed or undyed. If the face yarns are dyed, they may be solution dyed. The weight of the face yarn, pile height, and density will vary depending on the desired aesthetics and performance requirements of the end-use for the floor mat. The face yarns constructions include loop pile, cut pile, and combinations of loop pile and cut pile.

The primary backing layer can be any suitable primary backing material. The primary backing layer may be comprised of a woven, nonwoven or knitted material, or combinations thereof. The general purpose of the primary backing layer is to support the tufts of the face yarns. In one aspect, the primary backing layer is a nonwoven polyester spunbond material. One commercially available example of the polyester spunbond material is Lutradur® from Freudenberg Nonwovens of Weinheim, Germany. In another aspect, flat woven polyester tapes, such as Isis™ from Propex of Chattanooga, Tenn., may be utilized. Also, Colback® nonwoven backing material may also be suitable for use. If needed, a primary backing layer made of a woven tape with either staple fibers or nonwoven fabrics affixed can be used. Also, stitch bonded and knitted polyester fabrics may be used.

The tufted pile carpet that includes face yarns tufted into a primary backing layer may be heat stabilized to prevent dimensional changes from occurring in the finished mat. The heat stabilizing or heat setting process typically involves applying heat to the material that is above the glass transition temperature, but below the melting temperature of the components. The heat allows the polymer components to release internal tensions and allows improvement in the internal structural order of the polymer chains. The heat stabilizing process can be carried out under tension or in a relaxed state. The tufted pile carpet is sometimes also stabilized to allow for the yarn and primary backing to shrink prior to the mat manufacturing process.

Examples of suitable compositions for forming the second layer (i.e. the layer having direct contact with the base component) of the textile component include at least one polymer selected from the group consisting of thermoplastic and thermoset elastomers. Thermoplastic elastomers include thermoplastic vulcanizate, styrenic block co-polymer, thermoplastic polyurethanes, thermoplastic copolyesters, thermoplastic copolyamides, polyolefinic blends and mixtures thereof. Thermoset elastomers include natural rubber, synthetic rubber, and mixtures thereof. Thermoset elastomers include nitrile rubber (including dense nitrile rubber and foam nitrile rubber), polyvinyl chloride rubber, ethylene propylene diene monomer (EPDM) rubber, vinyl rubber, and mixtures thereof. In one aspect, the backing layer of the textile component is typically comprised of at least one rubber material. The rubber material may contain from 0% to 40% of a recycled rubber material.

In one aspect of the present invention, the tufted pile carpet is comprised of yarn tufted into fabric, which is then injection or fluid dyed, and then bonded with a rubber layer or washable latex backing. The carpet yarn may be selected from nylon 6; nylon 6,6; polyester; and polypropylene fiber. The yarn is tufted into a woven or nonwoven substrate. The yarn can be of any pile height and weight necessary to support printing. The tufted pile carpet may be printed using any print process. In one aspect, injection dyeing may be utilized to print the tufted pile carpet.

Printing inks will contain at least one dye. Dyes may be selected from acid dyes, direct dyes, reactive dyes, cationic dyes, disperse dyes, and mixtures thereof. Acid dyes include azo, anthraquinone, triphenyl methane and xanthine types. Direct dyes include azo, stilbene, thiazole, dioxsazine and phthalocyanine types. Reactive dyes include azo, anthraquinone and phthalocyanine types. Cationic dyes include thiazole, methane, cyanine, quinolone, xanthene, azine, and triaryl methine. Disperse dyes include azo, anthraquinone, nitrodiphenylamine, naphthal imide, naphthoquinone imide and methane, triarylmethine and quinoline types.

As is known in the textile printing art, specific dye selection depends upon the type of fiber and/or fibers comprising the washable textile component that is being printed. For example, in general, a disperse dye may be used to print polyester fibers. Alternatively, for materials made from cationic dyeable polyester fiber, cationic dyes may be used.

The printing process of the present invention uses a jet dyeing machine, or a digital printing machine, to place printing ink on the surface of the mat in predetermined locations. One suitable and commercially available digital printing machine is the Millitron® digital printing machine, available from Milliken & Company of Spartanburg, S.C. The Millitron® machine uses an array of jets with continuous streams of dye liquor that can be deflected by a controlled air jet. The array of jets, or gun bars, is typically stationary. Another suitable and commercially available digital printing machine is the Chromojet® carpet printing machine, available from Zimmer Machinery Corporation of Spartanburg, S.C. In one aspect, a tufted carpet made according to the processes disclosed in U.S. Pat. Nos. 7,678,159 and 7,846,214, both to Weiner, may be printed with a jet dyeing apparatus as described and exemplified herein.

Viscosity modifiers may be included in the printing ink compositions. Suitable viscosity modifiers that may be utilized include known natural water-soluble polymers such as polysaccharides, such as starch substances derived from corn and wheat, gum arabic, locust bean gum, tragacanth gum, guar gum, guar flour, polygalactomannan gum, xanthan, alginates, and a tamarind seed; protein substances such as gelatin and casein; tannin substances; and lignin substances. Examples of the water-soluble polymer further include synthetic polymers such as known polyvinyl alcohol compounds and polyethylene oxide compounds. Mixtures of the aforementioned viscosity modifiers may also be used. The polymer viscosity is measured at elevated temperatures when the polymer is in the molten state. For example, viscosity may be measured in units of centipoise at elevated temperatures, using a Brookfield Thermosel unit from Brookfield Engineering Laboratories of Middleboro, Mass. Alternatively, polymer viscosity may be measured by using a parallel plate rheometer, such as made by Haake from Rheology Services of Victoria Australia.

After printing, the tufted pile carpet may be vulcanized with a rubber backing. The thickness of the rubber will be such that the height of the finished textile component will be substantially the same height as the surrounding base component when the base component is provided in a tray configuration. Once vulcanized, the textile component may be pre-shrunk by washing.

The textile component may further comprise a magnetic coating layer. The magnetic coating layer is typically present on the surface of the textile component that is opposite the face yarns. Application of the magnetic coating layer to the tufted pile carpet will be described in greater detail below. The resulting textile component is wash durable and exhibits sufficient tuft lock for normal end-use applications. In one alternative embodiment of the invention, the textile component may be a disposable textile component that is removed and disposed of or recycled and then replaced with a new textile component for attachment to the base component.

After the textile component has been made, it will be custom cut to fit into the recessed area of the base component (for instances in which the base component is in the form of a tray) or onto the base component (for instances wherein the base component is substantially flat/trayless/without recessed area). The textile component may be cut using a computer controlled cutting device, such as a Gerber machine. It may also be cut using a mechanical dye cutter, hot knife, straight blade, or rotary blade. In one aspect of the invention, the thickness of the textile component will be substantially the same as the depth of the recessed area when the base component is in the form of a tray.

The base component typically contains a recessed area surrounded by a border. In one aspect, the border slopes gradually upward from outer perimeter to inner perimeter, to create a recess within the base, corresponding to the recessed area. The recessed area of the base component possesses a certain amount of depth, thereby defining it as "recessed."

The base component is a planar-shaped tray, which is sized to accommodate the textile component. The base component may also include a border surrounding the tray, whereby the border provides greater dimensional stability to the tray, for example, because the border is thicker, i.e. greater in height relative to the floor. Additionally, the border may be angled upward from its outer perimeter towards the interior of the base component, so as to provide a recessed area where the tray is located, thereby creating a substantially level area between the inner perimeter of the border and the textile component, when the textile component overlays the tray. Additionally, the gradual incline from the outer perimeter of the border to the inner perimeter of the border minimizes tripping hazards and the recess created thereby protects the edges of the textile component.

It can be understood that the base component may be subdivided into two or more recessed trays, by extending a divider from one side of the border to an opposite side of the border, substantially at the height of the inner perimeter. Accordingly, it would be possible to overlay two or more textile components in the recesses created in the base component.

The base component, including the border, may be formed in a single molding process as a unitary article. Alternatively, the border and the tray may be molded separately and then bonded together in a second operation. The tray and border may be made of the same or different materials.

In general, the base component may be comprised of any dimensionally stable material, as long as the material is durable and can be laid flat or otherwise conforming to the floor surface. Examples of suitable materials for forming the base component include: (a) at least one polymer selected from the group consisting of thermoplastic and thermoset elastomers, (b) a metal material, (c) a cellulose-containing material (such as wood), and (d) combinations thereof. Thermoplastic elastomers include thermoplastic vulcanizate, styrenic block co-polymer, thermoplastic polyurethanes, thermoplastic copolyesters, thermoplastic copolyamides, polyolefinic blends and mixtures thereof. Thermoset elastomers include natural rubber, synthetic rubber, and mixtures thereof. Thermoset elastomers include nitrile rubber (including dense nitrile rubber and foam nitrile rubber), polyvinyl chloride rubber, ethylene propylene diene monomer (EPDM) rubber, vinyl rubber, and mixtures thereof. In one aspect, the base component is typically comprised of at least one rubber material. The rubber material may contain from 0% to 40% of a recycled rubber material.

The base component may also include sensing mechanisms selected from the group consisting of electronic sensors, mechanical sensors, and combinations thereof. The sensing mechanisms may be used for transmitting tactile information to an electronic or analog receptor for further processing. These sensors may also include pressure sensors.

In one aspect, the base component may be formed into a tray shape according to the following procedure. Rubber strips are placed overlapping the edges of a metal plate. The metal plate is to be placed on top of a sheet rubber and covered on all 4 sides by strip rubber. As the mat is pressed, it will bond the sheet rubber to the strips. This process may be completed, for example, at a temperature of 370° F. and a pressure of 36 psi. However, depending upon the rubber materials selected, the temperature may be in the range from 200° F. to 500° F. and the pressure may be in the range from 10 psi to 50 psi. Using the recommend settings, the mat may be completely cured in 8 minutes. After the rubber strips are bound to the rubber sheet, the metal plate is removed leaving a void (i.e. a recessed area in the base component) in which to place the textile component. The textile component has the ability to be inserted and removed from the base component multiple times.

In one aspect, the floor mat may be presented in an arrangement wherein the textile component overlays the recessed area of the base component. As previously discussed herein, the base component of the floor mat may be in the form a tray. However, in one alternative embodiment, the base component of the floor mat may be flat and have no recessed area (i.e. the base component is trayless). A flat base component is manufactured from a sheet of material, such as a rubber material, that has been cut in the desired shape and vulcanized.

The back surface of the base component is the surface which lies on the floor and therefore has direct contact with the surface of the floor. Various patterns and/or protrusions on the back surface of the base component may be present so as to facilitate the base component's adherence to the floor. The protrusions may be present in a repeating pattern such that a three dimensional array of protrusions is formed having a uniform pattern.

The absorbent component of the absorbent floor mat may be comprised of any material that is designed to absorb liquid. For example, the absorbent component may be comprised of foam materials (such as polyurethane foam), fibrous materials (such as woven, knitted or nonwoven materials), molded materials (such as three-dimensional materials with cavities to hold liquid), and mixtures thereof. The absorbent component is shaped to fit into the recessed area of the base component.

The textile component and the base component may be attached to one another by magnetic attraction. Commonly owned U.S. Patent Application Ser. No. 62/201,148 filed on Aug. 5, 2015, describes a washable multi-component floor mat having magnetically attractive properties, as is entirely incorporated by reference herein. Magnetic attraction is achieved via application of a magnetic coating to the textile component and/or base component or via incorporation of magnetic particles in a rubber-containing layer prior to vulcanization. Alternatively, magnetic attraction can be achieved using both methods such that a magnetic coating is applied to the textile component and magnetic particles are included in the vulcanized rubber of the base component. The inverse arrangement is also contemplated.

The magnetic coating may be applied to the textile component and/or the base component by several different manufacturing techniques. Exemplary coating techniques include, without limitation, knife coating, pad coating, paint coating, spray application, roll-on-roll methods, troweling methods, extrusion coating, foam coating, pattern coating, print coating, lamination, and mixtures thereof.

In instances wherein magnetic attraction is achieved by incorporating magnetic particles in a rubber-containing layer, the following procedure may be utilized: (a) an unvulcanized rubber-containing material is provided (such as nitrile, SBR, or EPDM rubber), (b) magnetic particles are added to the unvulcanized rubber, (c) the particles are mixed with the rubber, and (d) the mixture of step "c" is formed into a sheet and attached to the bottom of the textile component and/or represents the base component. Mixing in step "c" may be achieved via a rubber mixing mill.

In this application, magnetizable is defined to mean the particles present in the coating or vulcanized rubber layer are permanently magnetized or can be magnetized permanently using external magnets or electromagnets. Once the particles are magnetized, they will keep their magnetic response permanently. The magnetizable behavior for generating permanent magnetism falls broadly under ferromagnets and ferrimagnets. Barium ferrites, strontium ferrites, neodymium and other rare earth metal based alloys are non-limiting examples of materials that can be applied in the magnetic coatings and/or vulcanized rubber layer.

As used herein, magnetically receptive is defined to mean the particles present in the coating and/or vulcanized rubber layer are only magnetically responsive in the presence of external magnets. The component that contains the magnetic particles is exposed to a magnetic field which aligns the dipoles of magnetic particles. Once the magnetic field is removed from the vicinity, the particles will become non-magnetic and the dipoles are no longer aligned. The magnetically receptive behavior or responsive magnetic behavior falls broadly under paramagnets or superparamagnets (particle size less than 50 nm).

Materials being reversibly magnetic is exemplified when the dipoles of the superparamagnetic or paramagnetic materials are not aligned, but upon exposure to a magnet, the dipoles line up and point in the same direction thereby allowing the materials to exhibit magnetic properties. Non-limiting examples of materials exhibiting these features include iron oxide, steel, iron, nickel, aluminum, or alloys of any of the foregoing.

Further examples of magnetizable magnetic particles include $BaFe_3O_4$, $SrFe_3O_4$, NdFeB, AlNiCo, CoSm and other rare earth metal based alloys, and mixtures thereof. Examples of magnetically receptive particles include $Fe_2O_3$, $Fe_3O_4$, steel, iron particles, and mixtures thereof. The magnetically receptive particles may be paramagnetic or superparamagnetic. The magnet particles are typically characterized as being non-degradable.

In one aspect of the invention, particle size of the magnetically receptive particles is in the range from 1 micron to 10 microns. Particle size of the magnetically receptive particles may be in the range from 10 nm to 50 nm for superparamagnetic materials. Particle size of the magnetically receptive particles is typically greater than 100 nm for paramagnetic and/or ferromagnetic materials.

Magnetic attraction is typically exhibited at any loading of the above magnetic materials. However, the magnetic attraction increases as the loading of magnetic material increases. In one aspect of the invention, the magnetic field strength of the textile component to the base component is greater than 50 gauss, more preferably greater than 100 gauss, more preferably greater than 150 gauss, or even more preferably greater than 200 gauss.

In one aspect, the magnetic material is present in the coating composition in the range from 25% to 95% by weight of the coating composition. In another aspect, magnetic particle loading may be present in the magnetic coating applied to the textile component in the range from 10% to 70% by weight of the textile component. The magnetic particle loading may be present in the magnetic coating applied to the base component in the range from 10% to 90% by weight of the base component.

The magnetically receptive particles may be present in the vulcanized rubber layer of the textile component in a substantially uniform distribution. In another aspect of the present invention, it is contemplated that the magnetically receptive particles are present in the rubber layer of the textile component in a substantially non-uniform distribution. One example of a non-uniform distribution includes a functionally graded particle distribution wherein the concentration of particles is reduced at the surface of the textile component intended for attachment to the base component. Alternatively, another example of a non-uniform distribution includes a functionally graded particle distribution wherein the concentration of particles is increased at the surface of the textile component intended for attachment to the base component.

The magnetic attraction between the textile component and the base component may be altered by manipulation of the surface area of one or both of the textile and/or base components. The surfaces of one or both of the components may be textured in such a way that surface area of the component is increased. Such manipulation may allow for customization of magnetic attraction that is not directly affected by the amount of magnetic particles present in the floor mat.

For instance, a substantially smooth (less surface area) bottom surface of the textile component will generally result in greater magnetic attraction to the top surface of the base component. In contrast, a less smooth (more surface area) bottom surface of the textile component (e.g. one having ripples or any other textured surface) will generally result in less magnetic attraction to the top surface of the base component. Of course, a reverse arrangement is also contemplated wherein the base component contains a textured surface. Furthermore, both component surfaces may be textured in such a way that magnetic attraction is manipulated to suit the end-use application of the inventive floor mat.

As discussed previously, the magnetic particles may be incorporated into the floor mat of the present invention either by applying a magnetic coating to surface of the textile component or by including the particles in the rubber material of the textile material and/or the base component prior to vulcanization. It is also contemplated to be within the scope of the present invention that magnetic particles or a magnetic coating maybe included on one or more surfaces of the absorbent component. Or, magnetic particles may be incorporated throughout the absorbent component.

When incorporation of magnetic particles is via a magnetic coating, a binder material is generally included. Thus, the magnetic coating is typically comprised of at least one type of magnetic particles and at least one binder material.

The binder material is typically selected from a thermoplastic elastomer material and/or a thermoplastic vulcanite material. Examples include urethane-containing materials, acrylate-containing materials, silicone-containing materials, and mixtures thereof. Barium ferrites, strontium ferrites, neodymium and other rare earth metal based alloys can be mixed with the appropriate binder to be coated on the textile and/or base component.

In one aspect, the binder material will exhibit at least one of the following properties: (a) a glass transition ($T_g$) temperature of less than 10° C.; (b) a Shore A hardness in the range from 30 to 90; and (c) a softening temperature of greater than 70° C.

In one aspect, an acrylate and/or urethane-containing binder system is combined with $Fe_3O_4$ to form the magnetic coating of the present invention. The ratio of $Fe_3O_4$:acrylate and/or urethane binder is in the range from 40-70%:60:30% by weight. The thickness of the magnetic coating may be in the range from 10 mil to 40 mil. Such a magnetic coating exhibits flexibility without any cracking issues.

Following application or inclusion of the magnetic particles into the textile component, absorbent component and/or base component, the particles need to be magnetized. Magnetization can occur either during the curing process or after the curing process. Curing is typically needed for the binder material that is selected and/or for the rubber material that may be selected.

During the curing process, the magnetizable particles are mixed with the appropriate binder and applied via a coating technique on the substrate to be magnetized. Once the coating is complete, the particles are magnetized in the presence of external magnets during the curing process. The component that contains the magnetic particles is exposed to a magnetic field which aligns the dipoles of magnetic particles, locking them in place until the binder is cured. The magnetic field is preferably installed in-line as part of the manufacturing process. However, the magnetic field may exist as a separate entity from the rest of the manufacturing equipment.

Alternatively, the magnetic particles may be magnetized after the curing process. In this instance, the magnetizable particles are added to the binder material and applied to the textile component, absorbent component, and/or base component in the form of a film or coating. The film or coating is then cured. The cured substrate is then exposed to at least one permanent magnet. Exposure to the permanent magnet may be done via direct contact with the coated substrate or via indirect contact with the coated substrate. Direct contact with the permanent magnet may occur, for example, by rolling the permanent magnet over the coated substrate. The magnet may be rolled over the coated substrate a single time or it may be rolled multiple times (e.g. 10 times). The permanent magnet may be provided in-line with the manufacturing process, or it may exist separately from the manufacturing equipment. Indirect contact may include a situation wherein the coated substrate is brought close to the permanent magnet, but does not contact or touch the magnet.

Depending upon the pole size, strength and domains on the permanent magnet (or electromagnet), it can magnetize the magnetizable coating to a value between 10 and 5000 gauss or a value close to the maximum gauss value of the magnetizing medium. Once the coating is magnetized, it will typically remain permanently magnetized.

Other attachment means may be utilized for attaching the textile component to the base component and forming a multi-component mat. For example, mushroom-shaped protrusions as disclosed in commonly owned U.S. patent application Ser. No. 14/818,402 filed on Aug. 5, 2015, which is entirely incorporated by reference herein, may be suitable attachment means.

Floor mats of the present invention may be of any geometric shape or size as desired for its end-use application. The longitudinal edges of the floor mats may be of the same length and width, thus forming a square shape. Or, the longitudinal edges of the floor mats may have different dimensions such that the width and the length are not the same. Alternatively, the floor mats may be circular, hexagonal, and the like. As one non-limiting example, floor mats of the present invention may be manufactured into any of the current industry standards sizes that include 2 feet by 4 feet, 3 feet by 4 feet, 3 feet by 5 feet, 4 feet by 6 feet, 3 feet by 10 feet, and the like.

The washable floor mat of the present invention may be exposed to post treatment steps. For example, chemical treatments such as stain release, stain block, antimicrobial resistance, bleach resistance, and the like, may be added to the textile component of the absorbent floor mat. Mechanical post treatments may include cutting, shearing, and/or napping the surface of the washable multi-component floor mat.

The performance requirements for commercial matting include a mixture of well documented standards and industry known tests. Tuft Bind of Pile Yarn Floor Coverings (ASTM D1335) is one such performance test referenced by several organizations (e.g. General Services Administration). Achieving tuft bind values greater than 4 pounds is desirable, and greater than 5 pounds even more desirable.

Resistance to Delamination of the Secondary Backing of Pile Yarn Floor Covering (ASTM D3936) is another standard test. Achieving Resistance to Delamination values greater than 2 pounds is desirable, and greater than 2.5 pounds even more desirable.

Pilling and fuzzing resistance for loop pile (ITTS112) is a performance test known to the industry and those practiced in the art. The pilling and fuzzing resistance test is typically a predictor of how quickly the carpet will pill, fuzz and prematurely age over time. The test uses a small roller covered with the hook part of a hook and loop fastener. The hook material is Hook 88 from Velcro of Manchester, N.H. and the roller weight is 2 pounds. The hook-covered wheel is rolled back and forth on the tufted carpet face with no additional pressure. The carpet is graded against a scale of 1 to 5. A rating of 5 represents no change or new carpet appearance. A rating of less than 3 typically represents unacceptable wear performance.

An additional performance/wear test includes the Hexapod drum tester (ASTM D-5252 or ISO/TR 10361 Hexapod Tumbler). This test is meant to simulate repeated foot traffic over time. It has been correlated that a 12,000 cycle count is equivalent to ten years of normal use. The test is rated on a gray scale of 1 to 5, with a rating after 12,000 cycles of 2.5=moderate, 3.0=heavy, and 3.5=severe. Yet another performance/wear test includes the Radiant Panel Test. Some commercial tiles struggle to achieve a Class I rating, as measured by ASTM E 648-06 (average critical radiant flux >0.45=class I highest rating).

The textile component of the floor mat may be washed or laundered in an industrial, commercial or residential washing machine. In one aspect, the textile component of the absorbent floor mat withstands at least one wash cycle in a commercial or residential washing machine whereby the textile component is suitable for re-use after exposure to the at least one wash cycle. Achieving 200 commercial washes on the textile component with no structural failure is preferred.

The following alignment and deployment techniques may be used for installing the multi-component absorbent floor mat:

In the first case, it has been found that if the top half (i.e. the textile component) is rolled up in a fairly tight roll—face in—and then placed down on the base, that the total attraction force is so reduced that an installer can slide the roll enough to be able to get a good alignment with the base using the exposed end of the roll as a guide to align to the base. This method is mainly envisioned for small two part mats. Alignment marks can be put on the base to assist the top alignment. This alignment and deployment technique relies upon the property of surface area reduction between magnetic coatings. By rolling up the textile component prior to placing it (or deploying it) onto the base component, magnetic attraction between the components is reduced.

The second method is to use the first method but coupled with a removable temporary "mask" that reduces the attractive force. This can be accomplished by using film, paper, or other sheeting material that is placed down on the base between the rolled up top and the base only in the area where the rolled up top will touch. Now that the total area is greatly reduced by the roll AND the force per unit area is reduced by the mask, then the ease of moving the roll around to achieve alignment is now even greater. Once alignment is achieved, the film, paper or other sheeting material is slid out.

A third method, that is a refinement of the removable mask method, is to use a mask that is permanently installed and that selectively masks only the most critical area—i.e. the area directly below the roll, and leaves the area near the mat edge alone. For example, if using a magnetic base and iron containing top, one can use a thin magnetically receptive material known as "FlexIron". This material has the ability to significantly reduce the magnetic force while at the same time strongly sticks to the magnetic base and thus will not move; the result is a permanently installed "mask". This mask is sized and positioned so as to only mask the magnetic force directly below the roll, but leaves the edges alone so as to keep the force high where the edges must resist kicking up. One still manually aligns the roll and its edge to the base, but now the alignment is relatively easy and can be done quickly. Additionally, the base component can be selectively magnetized so that a masking section is not magnetized. The perimeter around the masking section, as well as the perimeter that attracts the edge of the top piece, can be selectively magnetized.

A fourth method can be used in concert with any of the above methods or alone. This method relies on an alignment pins or grommets that can capture two or more of the carpet corners. The pins are located in either the base or top and associated with the pins are complementary holes in the top or base. Once inserted, the pins capture the other half of the carpet requiring such that the two halves cannot be separated without substantial force. Once captured, the top mat can be picked up and gently laid down in alignment with the base. If a mat top should become disturbed or misaligned in the field, it is relatively easy to realign by simply picking the top up and laying it back down. If used in concert with 1-3 above, alignment now becomes not only easy, but quick and precise. Furthermore if care is taken to ensure that the masked area is always below the alignment pins and is sufficient size so that if the top is picked up that where it drapes is masked, then alignment/deployment is always easy.

A fifth method is a refinement of number 4 whereby the attachment pins are hidden and not visible from the face of the mat top. Methods to accomplish this are tightly fitting grommets or strong magnets molded into or glued to the back of the top mat, or grommets with strong magnets—all associated with complimentary holes with or without magnets in the base. This method can also be used in association with any of the 1-3 methods.

Another variation includes a line or pattern of magnetic pairs on one end of the textile component that "snap" the textile component and base component together. These pairs can be spaced such that a single alignment is highly favorable over any other attraction. The magnet pairs may be arranged with opposing poles and the different pairs in the line or pattern have alternating spacing to prevent misalignment. Many of these alignment and deployment techniques are described in commonly owned U.S. Patent Application Ser. No. 62/201,149 filed on Aug. 5, 2015, which is entirely incorporated by reference herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

We claim:

1. A multi-component, absorbent floor mat comprising:
   (a) a textile component comprising (i) a first layer of tufted pile carpet formed by tufting face yarns through a primary backing layer and (ii) a second layer comprised of vulcanized rubber containing magnetic particles,
   (b) at least one absorbent component, and
   (c) a base component comprised of polyvinyl chloride rubber containing magnetic particles, and
   wherein the base component contains a recessed area and the at least one absorbent component is located in the recessed area of the base component, and wherein the textile component and the base component are releasably attachable to one another via magnetic attraction.

2. The floor mat of claim 1, wherein the textile component is located in the recessed area of the base component.

3. The floor mat of claim 1, wherein the at least one absorbent component is comprised of material selected from the group consisting of foam materials, fibrous materials, and molded materials.

4. The floor mat of claim 1, wherein at least a portion of the textile component is magnetically receptive.

5. The floor mat of claim 1, wherein at least a portion of the base component is magnetized.

6. The floor map of claim 1, wherein the textile component withstands at least one wash cycle in a commercial or residential washing machine whereby the textile component is suitable for re-use after exposure to the at least one wash cycle.

7. The floor mat of claim 1, wherein the at least one absorbent component is configured to be removable from the floor mat when soiled and/or wet.

8. A flooring system comprised of: (1) at least two multi-component, absorbent mats, wherein the multi-component, absorbent mat is comprised of:
   (a) a textile component comprising (i) a first layer of tufted pile carpet formed by tufting face yarns through a primary backing layer and (ii) a second layer comprised of vulcanized rubber containing magnetic particles,
   (b) at least one absorbent component, and
   (c) a base component comprised of polyvinyl chloride rubber containing magnetic particles, and
   wherein the base component contains a recessed area and the at least one absorbent component is located in the recessed area of the base component, and
   wherein the textile component and the base component are releasably attachable to one another via magnetic attraction; and
(2) a floor surface.

9. The flooring system of claim 8, wherein the base component contains a recessed area and the at least one absorbent component and the textile component are located in the recessed area of the base component.

10. The flooring system of claim 8, wherein the at least one absorbent component is comprised of material selected from the group consisting of foam materials, fibrous materials, and molded materials.

11. The flooring system of claim 8, wherein at least a portion of the textile component is magnetically receptive.

12. The flooring system of claim 8, wherein at least a portion of the base component is magnetized.

13. The flooring system of claim 8, wherein the textile component withstands at least one wash cycle in a commercial or residential washing machine whereby the textile component is suitable for re-use after exposure to the at least one wash cycle.

14. The flooring system of claim 8, wherein the at least one absorbent component is configured to be removable from the floor mat when soiled and/or wet.

* * * * *